United States Patent Office 3,306,112
Patented Feb. 28, 1967

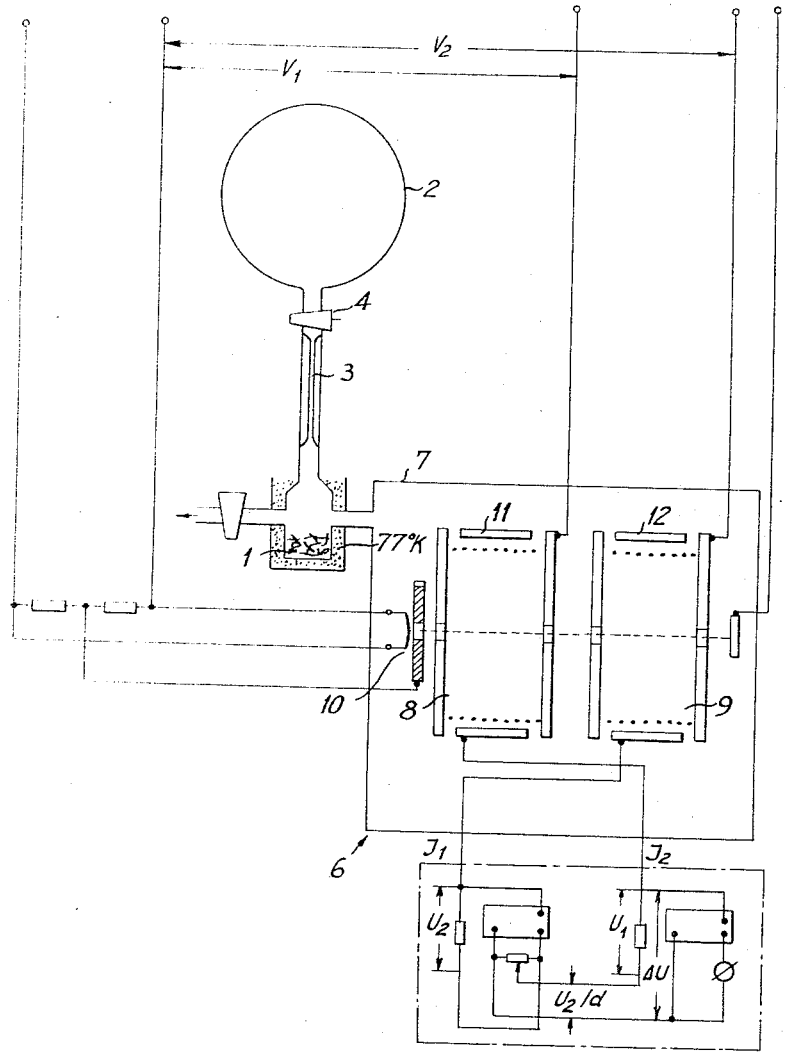

3,306,112
METHOD FOR DETERMINING THE SPECIFIC SURFACE OF NON-UNIFORMLY SHAPED SUBSTANCE BY MEASURING THE ADSORPTION OF NOBLE GASES OR INERT GASES AT THE SPECIMEN TO BE INVESTIGATED
Ludolf H. F. Jenckel, Muhlenthal, Germany, assignor to Atlas Mess- und Analysentechnik G.m.b.H., Bremen, Germany, a corporation of Germany
Filed Nov. 24, 1964, Ser. No. 413,430
Claims priority, application Germany, Dec. 3, 1963, A 44,697
4 Claims. (Cl. 73—432)

The invention relates to a method for determining the specific surface of non-uniformly shaped substances by measuring the adsorption of noble gases or inert gases at the specimen to be investigated, in which the gas is fed from a gas container into a measuring vessel containing the specimen, the adsorption isotherms which are dependent on the specific surface being determined by gas pressure measurement, for obtaining the so-called BET line.

In a known procedure of this kind, disclosed in German patent specification 1,057,798, two measuring vessels are used for the adsorption measurement, of which one contains the substance to be measured and the other contains filling bodies of small surface for volumetric compensation, the variation with time and also the absolute pressure in the adsorption vessel and also the differential pressure between the two vessels being made use of. The apparatus for performing this procedure is expensive, since two very accurately matched supply systems are necessary. Furthermore, the possibility must be present of quantitatively determining the volumetric alterations in the adsorption vessel by the space requirement of the specimen and adjusting the comparison side to this volumetric alteration. This is effected in practice by a standardization measurement with helium, which is not adsorbed at the measuring temperature. Furthermore, the performance of the known method is made difficult since continuously indicating differential pressure measuring arrangements can only be used for a relatively narrow pressure range. Continuously indicating devices for very low pressure differences below 1 torr are very expensive.

It is an object of the invention, to provide a method by which a large measuring range with high measurement accuracy can be achieved by relatively simple means for a continuous, automatic BET measurement. It is a further object of the invention to provide such a method in which a gas mixture consisting of two components, a measuring gas (for example argon) and a comparison gas (for example helium) is fed from a supply container into a measuring vessel, the partial pressure of the two components being measured and used for determining the adsorption isotherms which indicate the BET line.

Thus, in place of the simultaneous supply of a gas into two separated vessels, a gas mixture of a known composition of two components is fed into only one adsorption vessel containing the specimen, only the one component, that is to say the measuring gas being adsorbed by the specimen, whereas the other component, that is to say the comparison gas is not adsorbed. If the partial pressures of the two components are measured, then in this manner the adsorption isotherms necessary for construction of the BET line can be obtained.

The above and other objects of the invention will be clear from the following description given with reference to the accompanying drawing which is given by way of example and which is a diagrammatic view of an arrangement for adsorption measurement according to the invention, with partial pressure measurement by use of ionization with two differing electron energies.

A sample to be measured, for example activated charcoal, is disposed under a vacuum of for example $10^{-5}$ torr in a specimen vessel 1 at a temperature of for example 77° K. Argon is provided for example as the gas to be adsorbed, that is to say the measuring gas, and helium is provided as the comparison gas. For this purpose, a mixture of equal parts of argon and helium may be provided in a gas supply container 2, which is connected to the test vessel 1 by a flow throttle in the form of a capillary 3, which can be closed by means of an inlet valve 4.

After opening the inlet valve 4, the gas mixture flows into the test vessel. A proportion of the measuring gas is adsorbed, which depends on the size of the surface of the test substance. A different partial pressure ratio thus exists between the measuring gas and the comparison gas in the test vessel, than in the supply vessel.

This partial pressure ratio is a measure for the adsorbed gas amount, if the quantity of the measuring gas which has flowed in is known.

From the dependence of the adsorbed gas amount on the inflowing measuring gas amount and the measuring gas partial pressure in the test vessel, the BET line can be constructed in known manner and the surface of the test substance can be determined therefrom. The partial pressure of the comparison gas, which is practically not adsorbed at the measuring temperature serves as a measure for the measuring gas quantity which has flowed in.

The measurement of the partial pressures of the measuring gas and comparison gas in the test vessel can be effected with known means, for example mass spectroscopically. An especially simple method consists in that, as described above, the partial pressures of the two gas components in the test vessel are determined by subjecting the gas to an ionization with two different energies, which are adjusted in such a way that by means of the lower energy only the measuring gas and by means of the larger energy both gases are ionized.

This can be done by connecting the test vessel by means of a channel to a double ion source 6. As shown in the drawing, two ionization chambers 8 and 9 are provided in a common vacuum chamber 7 and the same electron beam flows through them from one electron source.

The voltage between the cathode 10 of the electron source and the ionization chamber 8 lies below the ionization voltage of the comparison gas but above the ionization voltage of the measuring gas. The ion current $J_1$ which arises in the ionization chamber 8 and which is intercepted by an ion interceptor 11 arises as a result only of the measuring gas and is a measure for the measuring gas partial pressure in the test vessel.

The potential between the cathode 10 and the ionization chamber 9 lies above the ionization voltages of the measuring gas and the comparison gas. The ion current $J_2$ intercepted with an ion interceptor 12 depends as a result of this on the measuring gas and on the comparison gas and is a measure for the sum of the partial pressure of the measuring gas and comparison gas in the test vessel.

From the two intercepted currents $J_1$ and $J_2$ at the interceptors 11 and 12, a difference voltage $$\Delta U = \frac{U_2}{d} - U_1$$

is derived by means of a compensation bridge 13 known from mass spectrometry for double interception measurements, and is used as a measure for the specific surface of the specimen.

With the double ion source, two different ion currents are obtained:

$$J_1 = k_1 \cdot p_M \quad (p_M = \text{partial pressure of the measuring gas}) \quad (1)$$

$$J_2 = k_2 \cdot p_M + k_3 \cdot p_{He} \quad (p_{He} = \text{partial pressure of helium}) \quad (2)$$

By means of the gas inflow, the partial pressure for the comparison gas helium increases according to a predetermined time function to $$p_{He} = (p_{He})_0 \cdot f(t)$$

The partial pressure of the measuring gas does not increase by the same amount, due to its adsorption by the specimen, but increases according to the formula $p_M = (p_M)_0 \cdot f(t) - \Delta p$; $\Delta p$ being dependent on $p_M$ and thus likewise being a function of $t$.

For the construction of the BET curve, the magnitudes $p_M$ and $\Delta_p$ are required. If these functions for $p_{He}$ and $p_M$ are placed in Equations 1 and 2, then $$J_1 = k_1 \cdot (p_M)_0 \cdot f(t) - \Delta_p \cdot k_1 \quad (3)$$

$$J_2 = k_2 \cdot (p_M)_0 \cdot f(t) - \Delta_p \cdot k_2 + k_3 \cdot (p_{He})_0 \cdot f(t) \quad (4)$$

or for the output voltages of the ion current amplifier which are proportional to these ion currents $$U_1 = k_1 \cdot (p_M)_0 \cdot f(t) - k_1 \cdot \Delta_p \quad (5)$$

$$U_2 = k_2 \cdot [(p_M)_0 + k_3 \cdot (p_{He})_0] f(t) - k_2 \cdot \Delta_p \quad (6)$$

The known gas composition $$\frac{(p_{He})_0}{(p_M)_0} = a$$

when placed in Equation 6 gives $$U_2 = (k_2 + k_3 \cdot a) \cdot f(t) - k_2 \cdot \Delta_p \quad (7)$$

From the voltage $U_2$ by means of a voltage divider an accordingly greater part $U_2/d$ is tapped, which follows the relation $$\frac{k_2 + k_3 \cdot a}{d} = k_1 \quad (8)$$

If the voltage $U_1$ and $U_2/d$ are compared in a compensation bridge and in this manner the difference $$\frac{U_2}{d} - U_1 = \Delta_U$$

is taken, then in accordance with Equations 5, 7 and 8 the following relation is obtained $$\Delta_U = \left(k_1 - \frac{k_2}{d}\right) \Delta_p \quad (9)$$

From the measurement according to Equation 1, for $p$ the value is obtained $$p = k_1 \cdot U_1$$

Since all magnitudes for the function $$\frac{p}{p_0 - p} \cdot \frac{1}{\Delta_p}$$

are known, the path of the BET line can be calculated. The constants $k_1$ and $k_2$ can be determined from a standardization measurement without a specimen at known pressures.

The adsorption measurement is continued in the usual way until a predetermined level of the continuously rising partial pressure of the measuring gas has been reached. Of course, if desired, the method can be performed alternatively with discontinuous inlet of the gas mixture.

I claim:
1. A method for determining the specific surface of a non-uniformly shaped substance such as charcoal, by measuring the adsorption of noble gases or inert gases at a specimen to be investigated, said method comprising feeding a known gas mixture from a gas supply container through an inlet in the form of a flow throttle into a single measuring vessel containing the specimen, said mixture comprising a measuring gas component which is adsorbed by the specimen and a comparison gas component which is substantially not adsorbed by the specimen, and measuring the partial pressures of the two gas components in the measuring vessel for deriving the adsorption isotherms which determine the BET line, said partial pressures being measured in a double ion source by subjecting the gas mixture to ionization in a first ionization chamber with one electron energy, which is sufficient for ionization of the measuring gas but is not sufficient for ionization of the comparison gas, and subjecting the gas mixture to ionization in a second ionization chamber with an electron energy which is sufficient for ionization both of the measuring gas and of the comparison gas.

2. A method as defined in claim 1, wherein the measuring gas is argon and the comparison gas is helium.

3. A method as defined in claim 1, and further comprising said measuring being carried out by measuring said partial pressures by forming a differential voltage from an amplified output voltage which is proportional to the ion current of the first ionization chamber and an amplified output voltage which is proportional to the ion current of the second ionization chamber, in accordance with a predetermined ratio based on the ionization possibilities of the gases and the starting off partial pressure relationship, whereby the resulting voltage difference is proportional to the measuring magnitude representative of the decrease in the partial pressure of the measuring gas as a result of adsorption by the test substance.

4. A method as defined in claim 1, wherein said measuring step is performed by the use of a mass spectrometer.

References Cited by the Examiner

UNITED STATES PATENTS 2,764,691  9/1956  Hipple _____ 250—41.9

FOREIGN PATENTS 1,057,798  5/1959  Germany.

OTHER REFERENCES

"Automatisches Gerat zur Bestimmung der Oberflachengrobe feinteiliger Substanzen" by N. Hansen et al., Zeitschrift fur Instrumentenkunde, July 1963, pp. 153 to 159.

"Vereinfachte Methode zur Messung von Oberflachengroben durch Gasadsorption" by R. Haul et al., from Chemie-Ing.-Technik, 1963, pp. 586–589.

RALPH G. NILSON, *Primary Examiner*.

WALTER STOLWEIN, *Examiner*.

W. F. LINDQUIST, *Assistant Examiner*.